May 28, 1929.　　　T. F. CHEEK　　　1,715,279
RECORD CONTROLLED MUSICAL INSTRUMENT
Filed May 7, 1921　　　7 Sheets-Sheet 1

May 28, 1929.  T. F. CHEEK  1,715,279
RECORD CONTROLLED MUSICAL INSTRUMENT
Filed May 7, 1921    7 Sheets-Sheet 2

May 28, 1929.   T. F. CHEEK   1,715,279
RECORD CONTROLLED MUSICAL INSTRUMENT
Filed May 7, 1921   7 Sheets-Sheet 3

May 28, 1929.  T. F. CHEEK  1,715,279
RECORD CONTROLLED MUSICAL INSTRUMENT
Filed May 7, 1921   7 Sheets-Sheet 4

Inventor,
Tolbert F. Cheek
By C. J. Stockman, Atty.

May 28, 1929. T. F. CHEEK 1,715,279
RECORD CONTROLLED MUSICAL INSTRUMENT
Filed May 7, 1921 7 Sheets-Sheet 5

May 28, 1929.  T. F. CHEEK  1,715,279
RECORD CONTROLLED MUSICAL INSTRUMENT
Filed May 7, 1921   7 Sheets-Sheet 6

Patented May 28, 1929.

1,715,279

UNITED STATES PATENT OFFICE.

TOLBERT F. CHEEK, OF NEW YORK, N. Y., ASSIGNOR, BY MESNE ASSIGNMENTS, TO WELTE-MIGNON CORPORATION, OF NEW YORK, N. Y., A CORPORATION OF DELAWARE.

RECORD-CONTROLLED MUSICAL INSTRUMENT.

Application filed May 7, 1921. Serial No. 467,648.

This invention relates broadly to record controlled pneumatic mechanisms for operating, or controlling the operation of musical instruments, particularly pianos, many of its elements and features being applicable to such mechanisms, broadly.

More particularly considered, however, it relates especially to automatic pianos of the horizontal or grand type and having an electrically driven pump for creating or inducing the pressures which operate the striker pneumatics, the pneumatic motor which feeds the perforated note sheet onto the take up roll and back onto the music roll, and the means for controlling the motor.

In the accompanying drawings illustrating the preferred embodiment of the invention, and in which drawings like characters of reference denote corresponding parts in the several views.

A designates an ordinary spool box having the usual tracker bar 11, take up spool 12 and stub shafts 13, $13^a$ to be engaged by the pins on the ends of the music roll 14. The take up spool is arranged below the tracker bar and is driven in a counter clockwise direction, viewed from the right hand, while feeding the record from the music roll.

B designates an ordinary pump for producing within the system the air tensions which influence the operations of the various pneumatic elements, and B¹ designates an electric motor, which may be of any suitable construction, for operating the pump. The pneumatic elements shown in the drawings comprise a motor C for feeding and rewinding the music roll, a motor control unit D, which includes a cut off pneumatic D¹, a rewind pneumatic D² and a replay pneumatic D³, arranged in a most compact relation; and a second motor control unit E, which includes a governor pneumatic E¹, a pneumatically operable valve 122 for opening up a by-path around the governor pneumatic from the motor to the source of power, for the rewinding operation, and a pneumatically operable valve 127 for closing the air passage between the motor and source of power. In addition to these, the mechanism will also include the usual, or any suitable striker pneumatics and if desired any suitable construction of expression means, together with parts for operating them from the tracker bar and under control of the music roll. Striker pneumatics and expression means, together with means for controllably actuating them are well known in the art and form no part of the present invention; hence, they are not herein illustrated.

Figure 1:
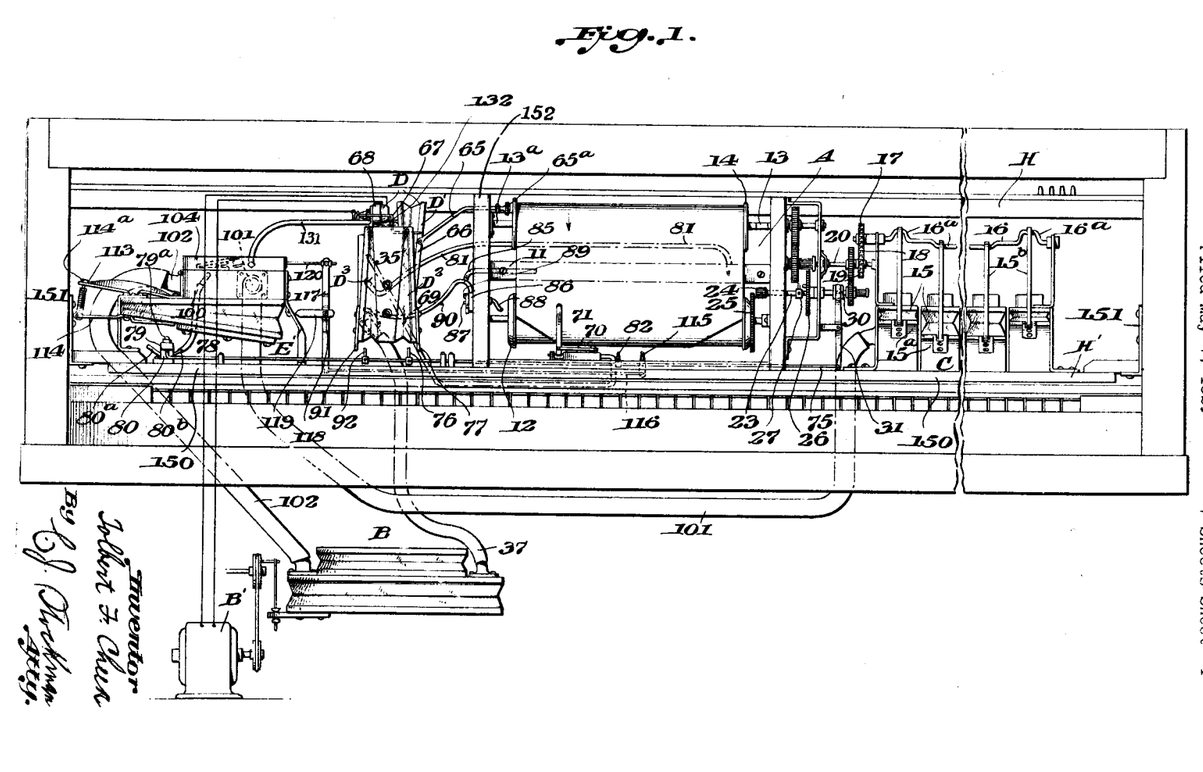
Fig. 1 is a front view of a part of a piano, showing the relative arrangement of the pneumatic motor, spool box and various elements of the motor control mechanisms, in the space at the front of the piano above the key board, the electric motor and pump, which may be arranged in any suitable part of the piano, being shown below the key board. In this view the parts are shown in the positions they occupy when the note sheet has been inserted and connected to the take-up spool and the circuit to the electric motor has been closed, but with the transmission mechanism still in neutral position.
Figure 2:
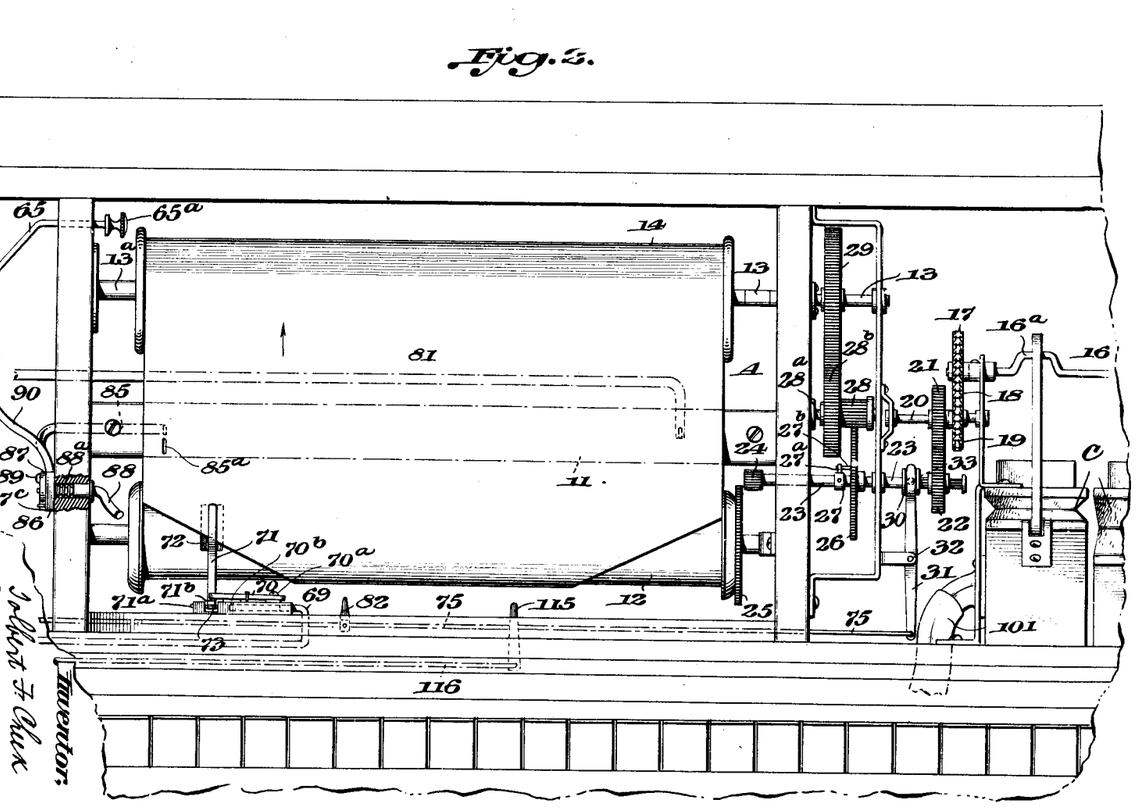
Fig. 2 is a front view, on a larger scale than the preceding figure, illustrating the spool box and the parts therein, and also one form of transmission mechanism which may be employed to drive the take up spool in a counter clockwise direction in the playing operation and to apply the power to the music roll, to drive the same in a clockwise direction, in the rewinding operation, the parts being shown in the position they occupy in the rewinding operation immediately prior to the end of such operation.
Figure 3:
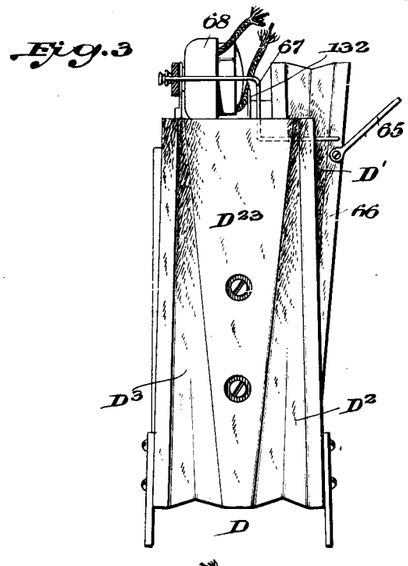
Fig. 3 is a front elevation of the control unit D.
Figure 4:
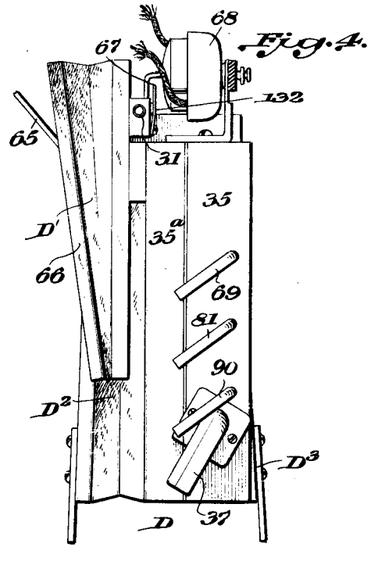
Fig. 4 is a rear elevation of said unit.
Figure 5:
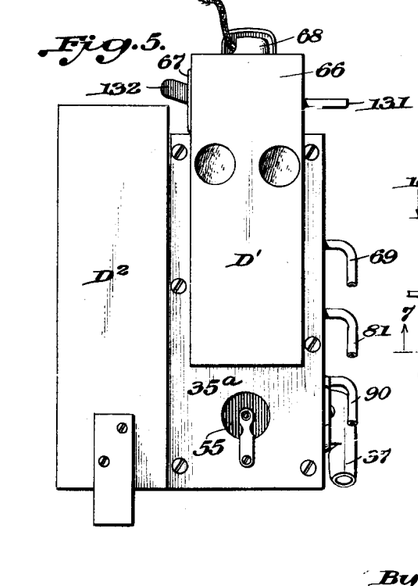
Fig. 5 is an elevation of the unit viewed from the side presented toward the spool box.
Figure 6:
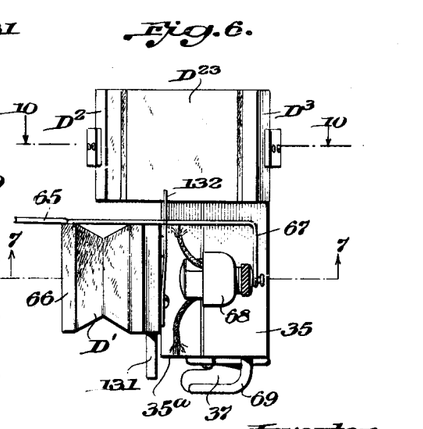
Fig. 6 is a plan view of said unit.
Figure 7:
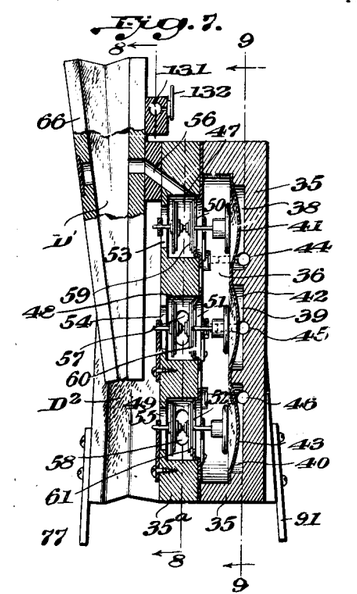
Fig. 7 is a section on the line 7—7 of Fig. 6.
Figure 8:
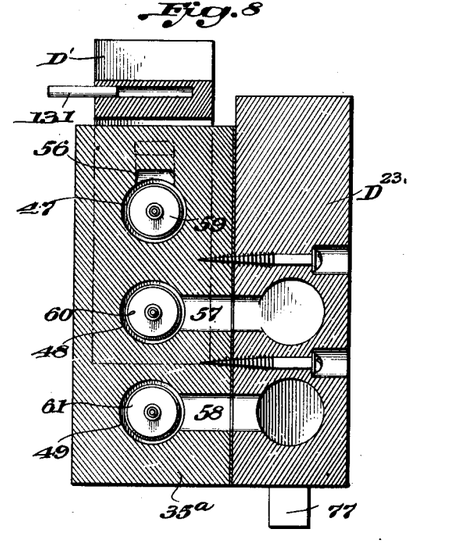
Fig. 8 is a section on the line 8—8 of Fig. 7.
Figure 9:
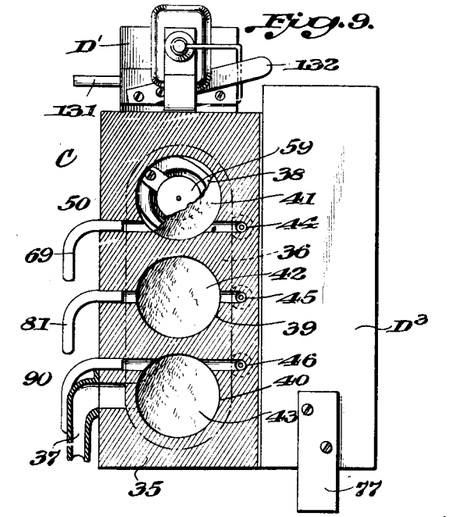
Fig. 9 is a section on the line 9—9 of Fig. 7.
Figure 10:
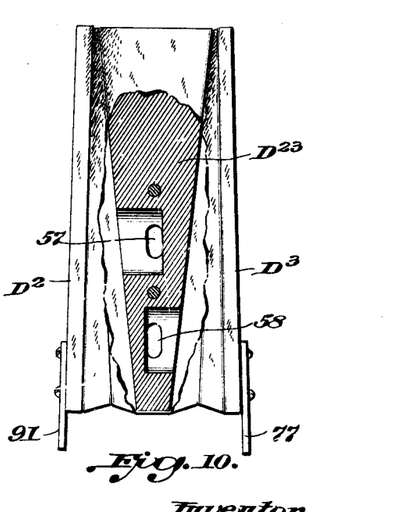
Fig. 10 is a section on the line 10—10 of Fig. 6.
Figure 11:
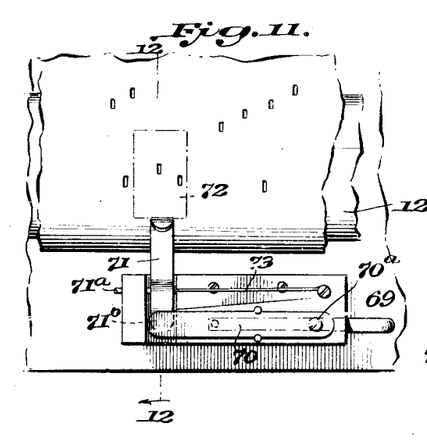
Fig. 11 is a detail plan view of a part of the spool box and take up spool showing a section of a perforated note sheet or record on the spool and also showing the primary valve of the means which controls the expansion and collapse of the electric cut off pneumatic and the means for actuating said valve.
Figure 12:
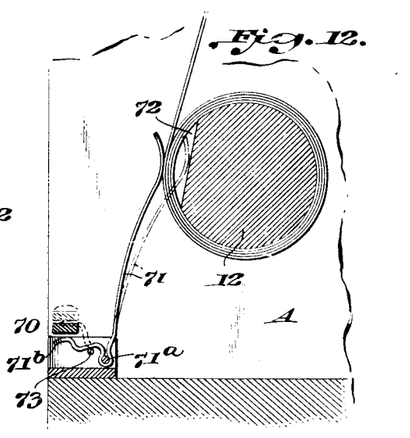
Fig. 12 is a vertical section on the line 12—12 of Fig. 11.
Figure 13:
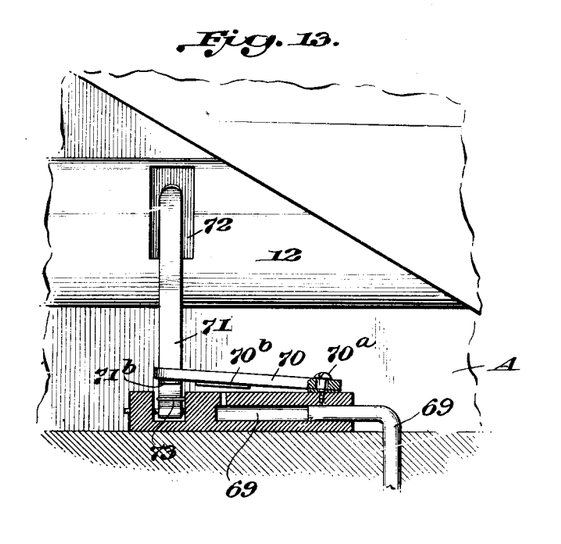
Fig. 13 is a view of the same parts shown in Figs. 11 and 12, partly in front elevation and partly in longitudinal section, but shows the correlation of the parts when the narrowing end of the music sheet has been reached in the re-winding operation and the aperture 72 in the take-up spool has thereby been exposed.
Figure 14:
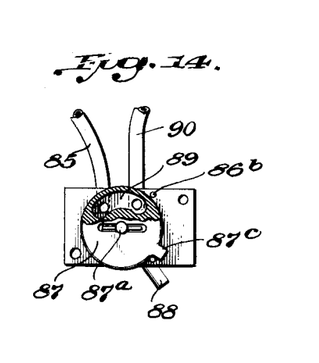
Fig. 14 is a detail view of the valvular device which is manually set to control the replay pneumatic and cause the music to be replayed or not, at will.
Figure 15:
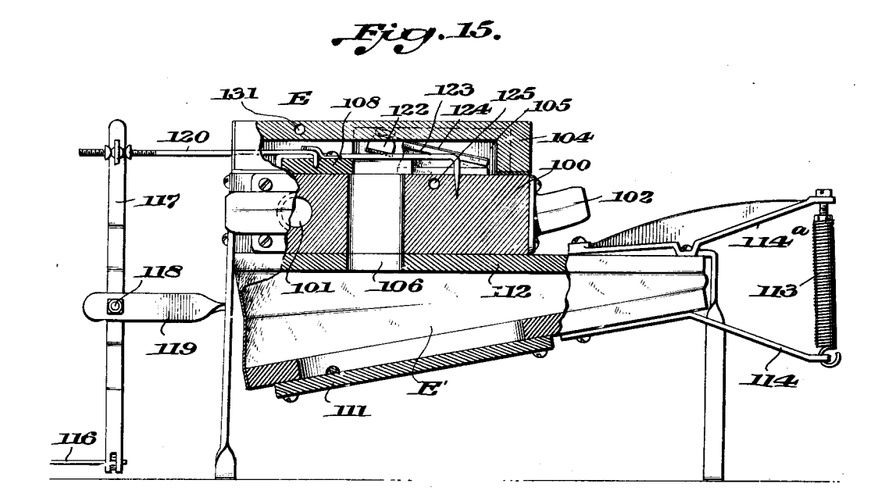
Fig. 15 is a view of the control unit E, partly in side elevation and partly in longitudinal vertical section, the section being taken on a line which extends through the port through which the interior of the governor-pneumatic $E^1$ has communication with the main suction chamber in the unit E, the line of section corresponding to that indicated at 15—15 in Fig. 17.
Figure 16:
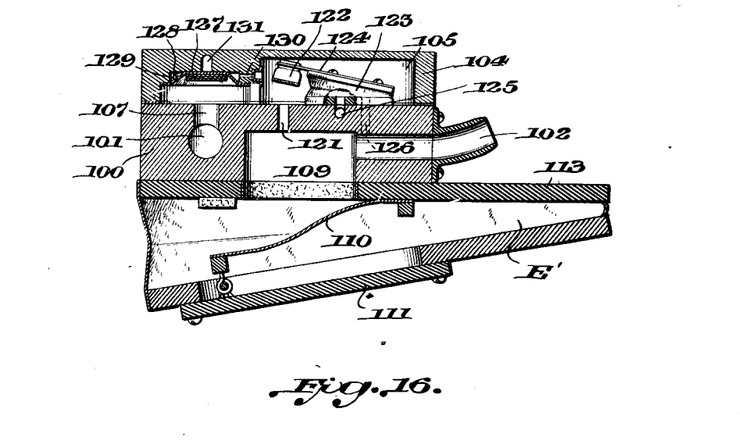
Fig. 16 is a vertical longitudinal sectional view on a line corresponding to the line 16—16 in Fig. 17.
Figure 17:
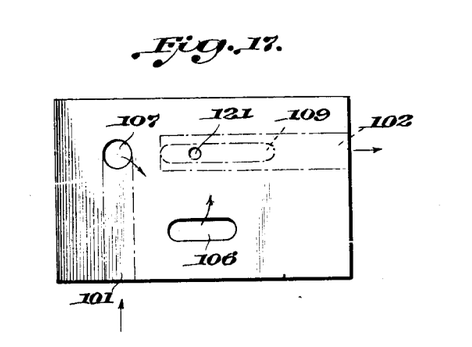
Fig. 17 is a detail plan view of the block or body part of the unit E, with the cover member and valves removed.
Figure 18:
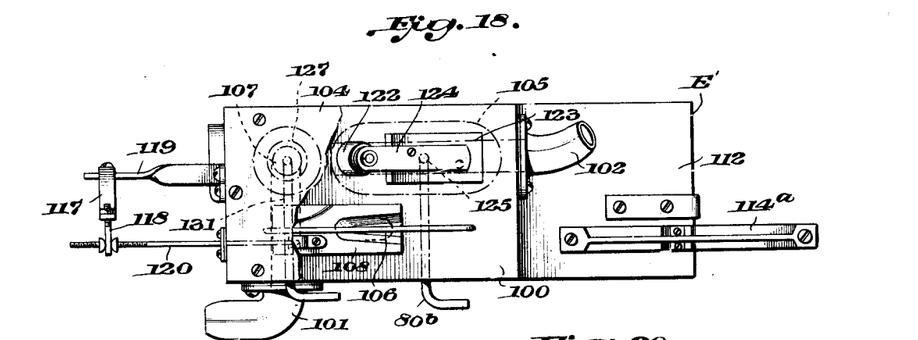
Fig. 18 is a plan view of said unit complete, with a part of the cover removed.
Figure 19:
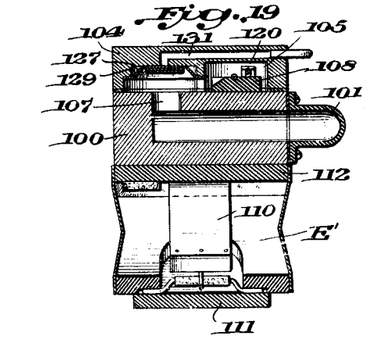
Fig. 19 is a transverse sectional view on the line 19—19 of Fig. 18.
Figure 20:
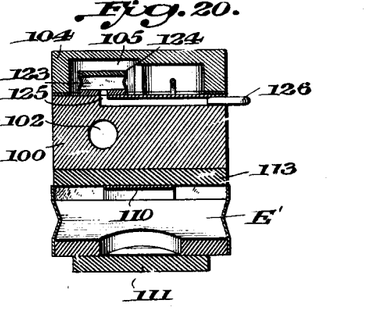
Fig. 20 is a transverse sectional view on the line 20—20 of Fig. 18.

The motor C herein illustrated is of that well known type which includes a plurality of horizontal bellows 15 whose movable boards 15ª are connected by rods 15ᵇ to the cranks 16ª of a crank shaft 16 arranged above the bellows and adjacent the front of the motor. This motor is arranged in the space between the pin block H and piano shelf H¹ and the rods 15ᵇ and cranks 16ª are arranged to drive said shaft in a counter clockwise direction viewed from the right hand, and the shaft drives a transmission mechanism, which may be of any construction suitable for applying power in a counter clockwise direction to the take up spool 12 in the feeding of the perforated music sheet or record from the music roll in playing, and for applying power to the music roll 14 in a clockwise direction, viewed from the right hand, to rewind the music sheet or record thereon, preparatory to the replaying of the music or to the removal of the roll from the spool box. The transmission mechanism here shown comprises a sprocket 17 mounted on the end of the crank shaft 16 and connected by a chain 18 with a sprocket 19 which transmits movement in a counter-clockwise direction to a counter shaft 20. This counter shaft 20 is provided with a gear 21 which meshes with a gear 22 having a keyway to receive a key projecting from a slidably mounted shaft 23 whose inner end extends into the spool box A and is provided within the latter with a pinion 24, to engage a gear 25 on the end of the take up spool 12 during the playing operation. The shaft 23 is also provided with a gear 26 which is loose thereon and with a collar 27 which is fast thereon. The gear 26 and collar 27 have co-operating projections 27ª and 27ᵇ which, in the rewinding operation, engage each other and operate to transmit movement from the shaft 23 to the gear 26. This gear 26 is meshed with a pinion 28 mounted on a counter-shaft 28ª. Upon this counter shaft there is also mounted a gear 28ᵇ, which may be attached to the pinion 28 and meshes with a gear 29 on the end of the music roll shaft 13. Accordingly, it will be seen that when the shaft 23 is moved longitudinally toward the left hand from the neutral position of the parts, (which neutral position is shown in Fig. 1) the pinion 24 will be thrown into mesh with the gear 25 and the latter will thereby be driven in a counter clockwise direction. At this time the collar 27 is disconnected from the gear 26. The music roll 14 is thus free to be rotated in a counter clockwise direction viewed from the right by movement imparted thereto from the take up roll, to which the power is applied. On the other hand, when the shaft 23 is moved longitudinally toward the right hand beyond the neutral position of the parts, as shown in Fig. 2, the pinion 24 is not engaged with the gear 25 and the projections 27ª and 27ᵇ of the gear 26 and collar 27 will be engaged with each other, whereby the power will be applied to the music roll 14 and the latter rotated in a clockwise direction while the take up spool 12 will be free to be rotated by the perforated music sheet thus being unrolled therefrom and rolled back onto the music roll.

As a means for moving the shaft 23 longitudinally it is shown as provided with a grooved collar 30 fixed thereon and engaged by a member 31 which is pivoted at 32 and has a portion which encircles or partially encircles the collar and is provided with projections 33 to engage the groove in the collar. This member 31 is moved pivotally by means hereinafter set forth.

The illustrated motor control unit D Figs. 3–10, inclusive, is provided with a block or body member preferably formed of two separable parts 35 and 35ª, suitably secured to each other. The part 35 is provided with a main chamber 36 (Fig. 7) having a duct 37 (Fig. 4) through which it is under suction from the main source of pneumatic power. This part is also provided with chambers 38, 39, and 40 (Fig. 7) separated from the suction chamber 36 by membranes 41, 42 and 43 and connected with said suction chamber by bleed openings 44, 45, and 46. The part 35ª of the block or body is provided with chambers 47, 48 and 49 having suction ports 50, 51 and 52 respectively, and atmospheric ports 53, 54, and 55, respectively. Channels 56, 57 and 58 extend from the chambers 47, 48 and 49 to the respective pneumatics D¹, D² and D³. The pneumatic D¹ is mounted on one side of the body member 35ª. The pneumatics D² and D³ have a common fixed board D²³ which is secured to an edge of the body part 35ª. The channels 57 and 58 extend into this board and communicate with the interiors of the pneumatics D² and D³, respectively. It will thus be seen that the pneumatics D¹, D² and D³ are grouped about the block or body member 35, 35ª in a most compact relation.

The chambers 47, 48 and 49 are provided with valve members 59, 60 and 61 respectively, whose stems are engaged by the corresponding membranes 41, 42 and 43, the correlation of parts being such that when air at atmospheric pressure is admitted to either of the chambers 38, 39 or 40, (as through ducts 68, 81 or 90, respectively, for example) the corresponding membrane will be inflated and will move the corresponding valvular member 59, 60 or 61, thereby opening the corresponding suction port 50, 51, or 52 and closing the corresponding atmospheric port 53, 54, or 55, and, similarly, when air at atmospheric pressure is excluded from the chambers 38, 39 and 40, the membranes will be deflated through the bleed holes 44, 45, 46, respectively and the valvular members will be moved to and close the suction ports and open the atmospheric ports. In this particular exemplification of the invention, the pressure of the atmosphere against those portions of the valve members 59, 60, or 61 which are presented to the atmospheric ports 53, 54, 55 may be relied upon to open the atmospheric ports and close the suction ports when chambers 38, 39, 40 are closed to the atmosphere and open to the suction chamber 36. Thus, it will be seen that pneumatics D', D², D³ will be forcibly collapsed when air at atmospheric pressure is admitted to chambers 38, 39, 40, respectively, through the communication thus temporarily established between the interiors of the respective pneumatics and the suction chamber 36 and that at all other times their interiors are in communication with the atmosphere through the ports 53, 54 and 55, respectively.

The means for starting and stopping the motor B' includes a manually operable starting member 65, an electric switch 68 of any suitable construction and the aforesaid cut off pneumatic D', so correlated that when the starting member 65 is operated in the prescribed direction to start the motor the switch will be operated to close the circuit through the motor, and when the pneumatic D' is collapsed under control of the record the switch will be operated to open the circuit through the motor. One arrangement of parts suitable for the purpose is illustrated, but arrangements differing therefrom in detail may be employed. In the illustrated arrangement the starting member 65 is a longitudinally movable rod one of whose ends is arranged in the spool box A, as is customary, and whose other end is attached to the movable board 66 of the pneumatic D', to which movable board there is also attached a rod 67 by which it is connected to the switch 68. When the parts are thus arranged, the motor is started by pulling the starting member longitudinally, thus moving the movable board of the pneumatic to a position somewhat beyond the position it occupies under non-operating conditions, i. e. when the pneumatic is under atmospheric pressure within and without. This manual movement of the board 66 closes the switch and starts the motor B'.

Whether or not the operating member be a longitudinal rod attached to the movable board of the pneumatic D', as illustrated, the starting member and pneumatic should be so correlated with each other and with the switch that when the starting member is operated in a certain direction the circuit including the motor B' will be closed and that during the operation of said motor the pneumatic D' will be in condition such that it may be collapsed under control of the record and when so collapsed will cause the switch to be operated to open said circuit and also cause the starting member to be restored to its former position. In order that the record may control the expansion and collapse of the pneumatic D', the chamber 38 is connected to an atmospheric duct 69 which extends therefrom and has its inlet in the spool box A and is opened at the completion of the rewinding operation of the music roll, to admit air at atmospheric pressure to the chamber 38, by a valve 70 having an operating member 71, primarily controlled by the music roll, as follows: The take up roll 12 is provided with a recess 72 near one of its ends, in line with the end of the member 71; the end of the perforated music sheet is tapered, as customary, whereby the recess will be exposed when the end of said sheet is reached in the rewinding operation, but at all other times when the music roll is in place will be covered by the music sheet; the valve 70 is so arranged with relation to the mouth of the duct 69 that it closes said duct at all times except when the end of the operating member 71 is permitted to fall into the recess 72 in the take up roll. Thus it will be seen that during the playing operation, and also during the rewinding operation until the perforated music sheet has been rewound upon its roll, the valve will be held to exclude the entrance of atmospheric air from the chamber 38 by the portion of the music sheet interposed between the recess 72 and the end of the operating member 71 and that when, in the rewinding operation, the narrowed end of the music sheet has reached and exposed the recess 72, the end of the member 71 will thereby be permitted to fall into said recess, thereby opening the duct 69 to the atmosphere, resulting in the collapsing of the pneumatic $D^1$ and the breaking of the circuit to the electric motor $B^1$. The operating member 71 here shown is pivotally mounted at $71^a$ and has a forwardly projecting end $71^b$ to engage the end of the valve 70 and is provided with a spring 73 which tends to force the free end of the operating member 71 into the recess and to raise the valve 70 and uncover the duct 69. The valve 70 is loosely held at $70^a$ so that it may fall gravitationally to close the duct 69 when the upper end of its operating member 71 is forced forward by the engagement therewith of the non-recessed section of the spool 12. The valve 70 is preferably provided with a pad $70^b$ to assure an air tight closure over the mouth of the duct 69.

The rewind pneumatic $D^2$ has a dual function. It acts, through an intermediate connection, upon the transmission mechanism to reverse the direction of feeding movement thereof, and also, and at the same time, acts through an intermediate means to cut off the communication which exists between the pump B and the player action during the playing operation. As here exemplified, the intermediate connection includes a longitudinally movable rod 75, having a projection 76 to be engaged by a projection 77 from the movable board of the rewind pneumatic. One end of this rod has suitable connection with the shaft 23 to move the same longitudinally in its bearings, and its other end, at 78, is connected to a valve 79 which controls an air duct $80^a$ leading from a block 80 to a gate box, (not shown). The connection here shown between the rod 75 and shaft 23 has already been described, being the pivoted member 31 and grooved collar 30. These operate to transmit longitudinal movement from the rod to the shaft in a direction the reverse of that of the rod. The gate box serves to break communication between the pump and player action when the valve 79 is shifted by movement of the rod 75 toward the left to thereby admit air at atmospheric pressure to the gate box. I have considered it to be unnecessary to illustrate or describe the gate box and its connection with the player action in detail, for the reason that these may be of well known or any suitable construction.

The valve 79 also controls a second duct, $80^b$, which leads from the block 80 to a port 125 which opens into a pneumatic 123. This pneumatic serves to open a passage for unregulated air between the motor and the air pump for the rewinding operation, as hereinafter more particularly set forth.

The player action, including the expression mechanism which is employed in pianos of the type commonly known as "reproducing pianos", as already stated may be of well known or any suitable construction and for this reason is not illustrated herein.

The correlation of the projections 76 and 77 from the rod 75 and pneumatic $D^2$, respectively, is such that collapsing of the pneumatic will act through said projections to shift the rod 75 toward the left thereby moving the shaft 23 toward the right beyond the neutral position of the parts and during said movement disengaging the pinion 24 from the gear 25 and engaging the collar 27 with the gear 26, thereby causing the music sheet to be rewound, as before explained. The pneumatic $D^2$ is collapsed under control of the music sheet, said sheet being provided for this purpose with a special aperture to open to the atmosphere a tracker duct 81 which is connected to the chamber 39 in the body member 35 of the motor control unit D.

Provision is also made for manual operation of the rod 75 to shift the shaft 23 from neutral to play position, and from play position to rewind position, and from either rewind position or play position to neutral position; this provision including an actuating member 82 suitably connected to the rod 75 to transmit movement thereto.

The replay pneumatic $D^3$ operates under control of the music sheet or record, which has a special perforation $85^a$ (Fig. 2) to open a tracker duct 85 which has connection with the chamber 40 in the body member 35 of the motor control unit D. The connection between the tracker duct 85 and the chamber 40 includes a member 86 having an axially movable control valve 87 provided with a handle 88 for turning it manually. This control valve has a port 89 through which in one position of the valve, communication of the duct 85 with a duct 90 is established said duct 90 extending from the member 86 to the chamber 40. In another position of the valve 87 communication between the ducts 85 and 90 is broken. As here illustrated the member 86 is a flat block having the mouths of the ducts 85 and 90 in its surface presented to the valve 87 and spaced from each other, and the port 89 is in the form of an arcuate channel formed on the inner surface of the valve 87, which valve is mounted to be oscillated about its axis, at 87ᵃ between stop pins 86ᵇ projecting from the member 86 in a spaced relation on opposite sides of a stop projection 87ᶜ from the periphery of the valve. A spring 88ᵃ on the handle 88 holds the valve against the surface of the member 86 while permitting said member to be turned manually upon said member. Accordingly, it will be seen that when the tracker duct 85 is opened air at atmospheric pressure will be admitted to the chamber 40 in the body member 35 of the motor control unit D, provided the valve 87 is in the position in which it opens communication between the ducts 85 and 90. The admission of atmospheric air to the chamber 40 results, as previously explained, in the collapsing of the pneumatic D³. This pneumatic has its movable board provided with a projection 91 to engage a corresponding projection 92 from the rod 75. These projections are so correlated that while the pneumatic D³ is being collapsed it will act to move the rod 75 toward the right, thereby shifting, as already explained, the shaft 23 toward the left and disengaging the collar 27 from the gear 26 and re-engaging the pinion 24 with the gear 25 whereupon the operation of unwinding the music sheet or record from its roll onto the take up spool is repeated.

On the other hand, if the valve 87 has not previously been turned to the position in which it opens communication between tracker duct 85 and duct 90 the opening of duct 85 will have no effect upon the replay pneumatic D³, as is apparent. Thus the playing of a record may be automatically repeated as often as necessary, without stopping the mechanism, or the record may be played only once, at the will of the operator.

The projections 76 and 92 as here shown are so arranged on the rod 75, and in such relation to the projections 77 and 91 from the pneumatics D² and D³, respectively, that when the rod 75 has been shifted to the left by the collapsing of the pneumatic D² the projection 92 will be substantially in contact with the projection 91, whereby the automatic shift from rewind to replay position may be promptly made.

The second motor control unit, E, is of a construction, details of which are claimed in my Patent No. 1,498,233, issued June 17, 1924 upon an application filed of even date herewith. It comprises a body member 100 having a duct 101 extending to it from the motor C and a duct 102 extending from it to the pump B. It also includes a cover member 104 preferably formed separate from the member 100 and having within it a chamber 105 from which a port 106 extends through the member 100 and opens into the interior of the pneumatic governor E¹, which is mounted on the side of the member 100 opposite the member 104. The duct 101 has communication with the chamber 105 through a port 107 formed in the member 104. A slide valve 108 is arranged to uncover the port 106 to a greater or less extent at will, this valve being adjustable by means presently set forth to control the tempo of the playing. The interior of the pneumatic governor E¹ has communication with the duct 102 through a port 109 formed in the member 100 and this port is automatically controlled by a flexible regulating valve 110 having its opposite ends secured to the movable and fixed boards 111 and 112 of the pneumatic E¹. A spring 113 operatively connected to said movable board 111 as by means of the arm 114, and to a suitable fixed support, as the arm 114ᵃ rigidly connected to the fixed board 112 of the pneumatic E¹, tends to keep the pneumatic expanded, but when the air within the pneumatic is rarefied, as it is in the operation of the mechanism, the tendency of the spring is overcome, as well understood, and the pneumatic is collapsed to a greater or less extent in accordance with the degree of the reduction of the tension of the air withing it and this is controlled primarily by the position of the valve 108 with relation to the port 106. The current of air in the playing operation, traverses the following course:—from the motor C through the duct 101 and port 107 into the chamber 105, thence through the port 106 into the pneumatic E¹, and from the pneumatic and into the duct 102 by way of the port 109, thence by way of the duct 102 to the pump. The valve 110 acts as a regulator to overcome any tendency of surging or speeding up or slowing down of the motor due to variations in the load induced by the operation simultaneously of varying number of striker pneumatics or of the varying forces with which the striker pneumatics are operated.

As a means for adjusting the valve 108, I have illustrated a manually operable lever 115 arranged adjacent the spool box and connected in any suitable way to one end of a longitudinally movable rod 116, whose other end is connected to one end of a lever 117 which is pivoted between its ends, at 118 to a suitable fixed support 119 and has its other end connected by a rod 120 to the valve 108.

It is desirable to rewind the music sheet at a greater speed than that imparted to it in the normal playing operation. As a means for this purpose, I have provided the member 100 with a port 121 which conducts unregulated air from the chamber 105 to the outlet opening 102, being here shown as opening directly into the port 109 from the chamber 105. This port 121 is controlled by a valve 122 carried by the pneumatic 123 hereinbefore referred to. The pneumatic 123 here shown is a bellows whose movable board is provided with a projection 124 to which the valve is attached. The member 100 is also provided with a port 125 and with a bleed hole 126, both open to the interior of the pneumatic 123, through which said pneumatic is under suction during the normal playing operation and is supplied with air at atmospheric pressure during the rewinding operation. The port 125 may be controlled by any suitable means, operative either manually or by the record, as desired. It will be understood that the pneumatic 123 is held in collapsed condition (and hence closes the valve 122 upon the port 121) during the playing operation and at the end of said operation air at atmospheric pressure is admitted to it, causing it immediately to expand and open the valve 122 to provide a passage for unregulated air from the chamber 105 to the duct 102. As a means for operating the pneumatic 123, I have shown the port 125 as connected with the duct 80$^b$ for the admission of atmospheric air to the pneumatic under control of the rewind pneumatic D$^2$ and have shown a connection (the bleed hole 126) between the pneumatic and the outlet duct 102, to collapse the pneumatic at the end of the rewinding operation. Other ways, than the one illustrated for controlling the pneumatic primarily by the music sheet, will readily suggest themselves.

It is sometimes desirable in the operation of the mechanism temporarily to cut off communication between the ducts 101 and 102 and moreover, it is always desirable to cut off communication between the pump and the pneumatic instantaneously upon the rewinding of the perforated music sheet or record upon its roll 14. Hence, I have provided a pneumatically operated valve 127 adapted to close the port 107. This valve is carried by a membrane 128, one of whose surfaces is exposed to the suctional force in the chamber 105 and the other of whose surfaces is exposed to the air in a chamber 129 having a bleed hole 130 extending to the chamber 105. A duct 131 opens into the chamber 129 and is provided with means whereby it may be opened to suctional force or to the atmosphere, at will. This means may be controlled manually, or by the record, or by either, as preferred. It will be noted that one effect of the closing of the port 107 will be the immediate stoppage of the pneumatic motor C by the cutting off of communication between the pump and the motor. Accordingly, it may be employed to supplement the stopping means which comprises the cut off pneumatic D$^1$ which operates to interrupt the circuit to the electric motor B$^1$, or it may be arranged to be operated independently of the pneumatic D$^1$ to cut off communication with the pneumatic motor C. As here shown, however, it is controlled by the same means which control the switch 68, it being noted that the duct 131 has its mouth in such relation to the pneumatic D$^1$ and switch 68 that it may be closed by a valve 132 arranged to be opened by the switch-operating rod 67 when the latter is operated to open the switch and break the circuit to the electric motor. The opening of the valve 132 admits air at atmospheric pressure to the chamber 129 thereby closing the valve 127 upon the port 107 and cutting off communication between pump B and the record-feeding and rewinding motor C, whereby overrunning of the latter is effectively prevented.

Attention is called to the fact that the motor C, the transmission mechanism, the spool box A and its contents, the motor control unit D, and the motor control unit E are all mounted upon a common board 150, which carries all of said parts and is provided with brackets 151 at its opposite ends for attaching it removably to the end walls of the piano case. The end walls 152 of the spool box are fixedly secured to said board 150 and carries the tracker and certain of the motor control elements as well as parts of the transmission mechanism. In short the parts are so correlated that they may be assembled upon the board and the whole inserted as a unit in the piano, and similarly removed as a unit from the piano for any repairs which may become necessary to any of the elements.

It is believed that the objects, construction and advantages of the mechanism will be understood from the foregoing description and also that the illustrated construction while set forth minutely in detail, yet is merely exemplary and that changes may be made in the details without departing from the spirit of the invention or the scope of the appended claims.

It will be especially noted that the mechanism in its entirety embodies a reconstruction and re-organization of elements of a nature such that one of the most important purposes of the invention is secured, namely, the provision of adequate and satisfactory controls for the feeding motor of an automatic grand piano, all adapted to be arranged at the front of the piano case and immediately above the key board, in the space now existent in such cases, of standard size and shape.

Having thus described the invention, what I believe to be new and desire to secure by Letters Patent, and what I therefore claim, is:

1. In a record controlled musical instrument, a take up spool, a rewinding shaft for connection to the music roll, a crank shaft, pneumatic means to apply power to the crank shaft in a counter clockwise direction, viewed from the right, a transmission mechanism including means for applying power from the crank shaft to the take up spool to rotate said spool in the same direction as the crank shaft, and means for applying power from the crank shaft to the rewinding shaft to rotate the latter in a direction the reverse of that of said crank shaft, and shifting means connected to the transmission mechanism for bringing either power applying means into operation, at will.

2. In a record controlled musical instrument, a take up spool, a rewinding shaft for connection to the music roll, a crank shaft, pneumatic means to apply power to the crank shaft in a counter clockwise direction, viewed from the right, a transmission mechanism including means for applying power from the crank shaft to the take up spool to rotate said spool in the same direction as the crank shaft and means for applying power from the crank shaft to the rewinding shaft to rotate the latter in a direction the reverse of that of said crank shaft, a longitudinally movable shifting rod, and connections between said rod and the transmission mechanism acting upon the latter to bring the power applying means into operation.

3. In a record controlled grand piano, a key bed and a pin block spaced from each other, a source of pneumatic power, a pneumatic motor having communication therewith and arranged in the space between the key bed and the pin block and provided with a longitudinal crank shaft arranged at the front thereof and to be driven in a counter clockwise direction, viewed from the right, a spool box at one end of the motor, said spool box having a tracker bar, a rewinding shaft and a take up spool, and a transmission mechanism, including elements for applying power from the counter clockwise movement of the motor crank shaft to the take up spool to rotate the same in a counter clockwise direction as viewed from the right, in the feeding of the record from the music roll, and also for applying power from counter clockwise movement of the motor crank shaft to the rewinding shaft to rotate the same in a clockwise direction in the rewinding of the record back onto the music roll, the rewinding shaft running free and with the take up spool when the power is applied to the latter and the take up spool running free and with the rewinding shaft when the power is applied to the latter.

4. In a record controlled musical instrument, a pneumatic motor, an electrically driven pneumatic pump, pneumatic connections between the pump and motor and a starting and stopping means comprising an electric circuit, a switch in said circuit, a pneumatic, a connection between the pneumatic and the switch, a humanly operable connection to the pneumatic to operate the latter to close the switch, and a chambered and ported member having connection with the pump and with the atmosphere and also with the pneumatic, and having a record controlled pneumatically operable valve for controlling its communication with the pneumatic.

5. In a record controlled musical instrument, a pneumatic motor, an electrically driven pneumatic pump, pneumatic connections between the pump and motor and a starting and stopping means comprising an electric circuit, a switch in said circuit, a pneumatic having a movable board, a humanly operable starting lever connected to said movable board, a separate connection between the movable board and switch to close the latter when the movable board is operated by said lever, and a chambered and ported member having connection with the pump and with the atmosphere and also with the pneumatic, and having a record-controlled pneumatically-operable valve for controlling its communication with the pneumatic.

6. In a record controlled musical instrument, a source of pneumatic power, including an electrically driven pneumatic pump and a switch for controlling the driving means for the pump; a motor; means operated by the motor and having record-driving elements shiftable to drive the record in opposite directions, for unwinding and rewinding operations, respectively; pneumatic connections between the motor and the main source of power, including a pneumatic governor; means for variably opening a path, including the governor, between the main source of power and the motor; record controlled means for shifting the record-driving elements to rewind the record and for opening communication between the main source of power and the motor, outside the governor; a valve to close communication between the main source of power and the motor; and record controlled means to close the latter valve and open the switch at the end of the rewinding operation.

7. In a means for controlling the speed of the record feeding motor of a record-controlled musical instrument, a body member having an air inlet opening and an air outlet opening, and provided with a chamber in communication with the inlet opening and also provided with a pneumatic, and having means through which the pneumatic has communication with the chamber and with the air outlet opening, a regulating valve operated by the pneumatic and variably controlling the communication between the pneumatic and the outlet opening, a valve for controlling communication between the chamber and the pneumatic and means for operating said valve, comprising a humanly operable tempo lever, a link connected to one end thereof, a second lever, pivoted between its ends and having one end connected to the link, and a connection between the other end of the link and the valve.

8. A motor control unit for a record controlled musical instrument, comprising a chambered main body member, having an inlet opening and an outlet opening and ports through which said openings have communication with the chamber, and also having openings which are in communication with each other and through which the chamber has communication with one of the first named openings, a humanly operable valve operatively related to one of the second named openings, a pneumatic governor in communication with said second named openings, pneumatically operable valves for controlling the ports and means for controlling the latter valves individually.

9. A motor control unit for a record controlled musical instrument, comprising a chambered main body member, having an inlet opening and an outlet opening and ports through which said openings have communication with the chamber, and also having openings which are in communication with each other and through which the chamber has communication with one of the first named openings, a humanly operable valve operatively related to one of the second named openings, a pneumatic governor in communication with said second named openings, pneumatically operable valves for controlling the ports and record controlled means for controlling the latter valves individually.

10. A motor control unit for a record controlled musical instrument, comprising a chambered and ported main body member having an inlet opening and an outlet opening and passages through which the chamber has communication with one of said openings, a pneumatic governor having communication with the inlet and outlet openings through said passages and chamber, a manually operable valve for controlling communication of the pneumatic governor with said chamber, and a plurality of valves respectively controlling said ports, one of said valves operating to close communication between said inlet and outlet openings and the other operating to open a direct passage from the chamber to one of the openings for rewinding operation, and means for closing the latter valves, individually.

11. A motor control unit for a record controlled musical instrument, comprising a chambered and ported main body member having an inlet and an outlet opening and passages through which the chamber has communication with one of said openings, a pneumatic governor having communication with the inlet and outlet openings through said passages and chamber, a manually operable valve for controlling communication of the pneumatic governor with said chamber, and a plurality of valves respectively controlling said ports, one of said valves operating to close communication between said inlet and outlet openings and the other operating to open a direct passage from the chamber to one of the openings, for rewinding operation, and record controlled means for closing the latter valves, individually.

12. In a record controlled musical instrument, a source of pneumatic power, a motor, a transmission mechanism, a record-feeding spool and a rewinding shaft, in combination with a control unit including a stop pneumatic, a rewinding pneumatic and connection between the rewinding pneumatic and the transmission mechanism, and a second control unit, including a governor, a rewind valve and a stop valve, a connection to control the rewind valve of one unit from the rewind pneumatic of the other unit, and a connection to control the stop valve of one unit by the stop pneumatic of the other unit.

13. In a record controlled musical instrument, a pneumatic motor, an electrically driven pneumatic pump, pneumatic connections between the pump and motor and a starting and stopping means comprising an electric circuit, a switch in said circuit, a pneumatic having a movable board, means connecting the movable board to the switch to open the switch by movement of the board in one direction and to close the same by movement of the board in the opposite direction, record controlled means connected to the pneumatic to move said board to open the switch, and a longitudinally movable starting member pivoted at one end to said board and operable thereon to close the switch.

14. In a record controlled musical instrument, record feeding and rewinding mechanism, including a spool having a depression, a starting means, a pneumatic operable to start the mechanism, a pivoted member having its free end arranged to enter the depression when the latter is exposed in the rewinding operation, and its opposite end provided with a lateral projection, a spring to press the free end of said member toward the spool, a pivoted valve having one of its ends in contact with the lateral projection from the pivoted member and an air connection to the pneumatic having its mouth arranged to be opened and closed by said valve.

15. In a record controlled musical instrument, record feeding and rewinding mechanism, including a spool having a depression, a starting means, a pneumatic operable to start the mechanism, a pivoted member having its free end arranged to enter the depression when the latter is exposed in the rewinding operation, and its opposite end provided with a lateral projection, a spring to press the free end of the said member toward the spool, a substantially horizontal valve pivoted at one end and having its other end in contact with the lateral projection from said pivoted member to be raised when the free end of the pivoted member falls into the depression in the spool and to be closed by gravity when the free end of the pivoted member is moved out of said depression, and an air connection to the pneumatic having its mouth arranged to be opened and closed by said valve.

16. In a record controlled musical instrument, a player action, a source of power, a motor, a transmission mechanism operated by the motor and comprising a take-up shaft, a rewind shaft and an element movable to cause the power to be applied to the take-up shaft and to the rewind shaft alternately, a pneumatic connection between the motor and the source of power, having a valve to close it, a pneumatic connection through which the player action of the instrument is operated from the source of power, including a valve to render the source of power operative and inoperative with relation to the player action, a control unit comprising a body member, a rewind pneumatic and a replay pneumatic, said body member having passages in communication with the pneumatics, respectively, and record controlled means to vary the tension of the air in the respective passages, an actuating member connected to the movable member of the transmission mechanism and to the valve which renders the source of power operative and inoperative with relation to the player action, a connection between said member and the rewind pneumatic, a connection between said member and the replay pneumatic, a stop pneumatic, and a connection between the stop pneumatic and the valve which closes communication of the source of power with the motor.

17. In a record controlled musical instrument, a player action, a source of pneumatic power, including an electric motor and its circuit and a pneumatic pump operated by the motor, a record feeding and rewinding motor, a transmission mechanism driven thereby, three control pneumatics, and interrelated connections between the pneumatics, the motor and the source of power, embodying elements operable with relation to the transmission mechanism to reverse the direction of movement of the record to rewind the same under control of one pneumatic, and again to reverse it under control of another of the pneumatics, to replay the record, and elements to cause the motor to be placed under the power of unregulated air and communication of the source of power with the player action to be cut off while the rewinding operation is taking place and to place the motor under the action of regulated air and reopen communication of the source of power with the player action while the record is being replayed, and finally to open the circuit to the switch and also to close communication between the pump and motor, under control of the third pneumatic, and record controlled means to operate said pneumatics severally, including a means whereby the pneumatic which controls the replay operation may be rendered operative and inoperative successively.

18. In a record controlled musical instrument, a player action, a pneumatic pump; an electric motor to drive the same; a pneumatic motor; connections between the pump and pneumatic motor, including a series of valves, one to control the passage of regulated air, another for unregulated air, and the other to close communication between the pump and pneumatic motor, entirely; a transmission mechanism driven by the pneumatic motor, and including a take-up shaft, a rewind shaft and a shiftable element operable to cause the power to be applied to said shafts, alternately; a device operable to cause communication between the pump and player action of the instrument to be opened and closed and, also to cause the valve which controls the passage for unregulated air between the pneumatic motor and pump to be opened and closed; an actuating member connected to the shiftable element of the transmission mechanism and to said device; a rewind pneumatic connected to said member to operate the same to shift the shiftable element of the transmission mechanism to rewind position and to move said device to close communication between the pump and player action and to open the valve for unregulated air; a replay pneumatic connected to said member to operate the same to shift the shiftable element of the transmission mechanism back to play position and to move said device to open communication between the pump and player action and to close the valve for unregulated air; a stopping pneumatic; means operated by the latter to open the circuit to the motor and to close the valve which cuts off communication between the pump and pneumatic motor; and record controlled means to operate the several pneumatics.

19. A motor control unit for a record controlled musical instrument comprising a chambered and ported main body member provided with record controlled valves, and independently operable rewinding and replay pneumatics arranged back to back and having a common fixed board which is secured to and projects from the main body member and has channels through which the pneumatics are controlled by the valves of the main body member, respectively.

20. A motor control unit for a record controlled musical instrument comprising a chambered and ported main body member provided with record controlled valves, a stop pneumatic secured to said main body member and controlled by one of the valves thereof, and independently operable rewinding and replay pneumatics arranged back to back and having a common fixed board which is secured to and projects from the main body member and has channels through which said pneumatics are controlled by the other valves of the main body member, respectively.

21. In a record controlled musical instrument, a tracker means to feed the record in opposite directions over the tracker for playing and rewinding operations, respectively, a longitudinally movable member operable with relation to said means to control the direction of movement of the record and means to shift said member longitudinally in opposite directions under control of the record; said means consisting of a control unit, comprising a fixed member having channels and ports and disconnected movable members forming, with said fixed member, a pair of independently movable pneumatics arranged back to back and having a common fixed member, the control unit also comprising a body member to which said fixed member is secured and from which the fixed member projects, the body member having a plurality of chambers in communication with the channels in the fixed member, respectively, and also having tracker controlled means to control the tensions of the air in said chambers, respectively, and said longitudinally movable members having projections for engagement respectively by the independently operable pneumatics, to shift the longitudinally-movable member in one direction and the other, respectively.

22. In a record controlled musical instrument, a pneumatic motor, an electrically driven pneumatic pump, pneumatic connections between the pump and motor and a starting and stopping means comprising an electric circuit, a switch in said circuit, a bellows having a movable member, a connection between the said movable member and the switch, operated by movement of said bellows member in one direction to open and in the other direction to close the switch, means under control of a record to operate said movable member of the bellows in one direction, and a member under control of the operative and having one of its ends attached to said movable member to move the latter in the other direction.

23. In a record controlled musical instrument, a casing having a key board and a space above its key board, and a pneumatic player action, in combination with a spool box, a transmission mechanism, a pneumatic motor and mechanism for controlling the operations of the transmission mechanism and motor, a common support separate from the casing and from the other parts of the player mechanism, upon which common support the said spool box, transmission mechanism, motor and control mechanism are secured in proper assembled relation to form with said support an independent unit, and means to secure said unit in said space in the casing in proper relation with the pneumatic player action and to permit its removal from the casing independently of the player action.

In testimony whereof I affix my signature.

TOLBERT F. CHEEK.